FIG. I

INVENTORS.
EDWARD T. ESPENLAUB
CHARLES H. MENGES
BY
Davis, Hoxie, Faithfull & Hapgood
ATTORNEYS.

July 17, 1962  E. T. ESPENLAUB ET AL  3,045,107
ELECTRIC ARC WELDING APPARATUS
Filed June 27, 1960  2 Sheets-Sheet 2

INVENTORS.
EDWARD T. ESPENLAUB
CHARLES H. MENGES
BY
Davis, Hoxie, Faithfull & Hapgood
ATTORNEYS.

United States Patent Office 3,045,107
Patented July 17, 1962

3,045,107
ELECTRIC ARC WELDING APPARATUS
Edward T. Espenlaub, 186 Watervliet Ave., and Charles H. Menges, 12 Van Rensselaer Road, both of West Albany, N.Y.
Filed June 27, 1960, Ser. No. 38,888
8 Claims. (Cl. 219—127)

This invention relates to a new and useful improvement in spot arc welding apparatus and, more particularly, to manually operated devices of which so-called welding guns are a good example.

The purpose and effect of this invention is the provision of simple and inexpensive means in a spot welding apparatus that enables the operator to maintain pressure holding the parts to be welded together before, during and after the weld has been formed. It has been found that when high voltage is used for spot welding, expensive apparatus is required to break the circuit after the weld is complete if afterburning of the electrode is to be avoided. This invention provides an inexpensive means of breaking the circuit so that uniform welds result that are free from burns regardless of the voltage employed.

The nature and substance or principle of the invention is the provision of trigger means to advance the welding electrode a predetermined length to complete the weld and thereupon disengage the advancing means causing the electrode to be rapidly withdrawn. Rapid withdrawal breaks the circuit at the arc and this allows a uniformly smooth and unburned weld button to form. In combination with these trigger means, there is provided a support rod which remains fixed with respect to the welding gun during the welding operation. In the use of consumable electrodes, indexing and sliding means are provided to allow the support rod to be moved after each weld to compensate for that amount of rod consumed.

In operation, the welder need only locate the spot, place the gun against it and, while applying pressure against the work, squeeze the trigger. The arc is struck when the electrode approaches the work and continues until rearward action of the trigger is complete, after which the electrode is rapidly withdrawn. Pressure may be continued until the weld has cooled. Needed adjustment in the supporting rod is made after the gun is removed from the work and the cycle can then be continued.

The attached drawings illustrate and the following text describes an illustrative embodiment of the invention specifically developed for a portable, manually operated spot welding gun employing consumable electrodes. Other applications of the invention such as in connection with non-consumable electrodes are obvious. The embodiment here disclosed may be taken as setting forth, in accordance with the statutory requirement, the best mode now contemplated of carrying out the invention.

Figure 1:
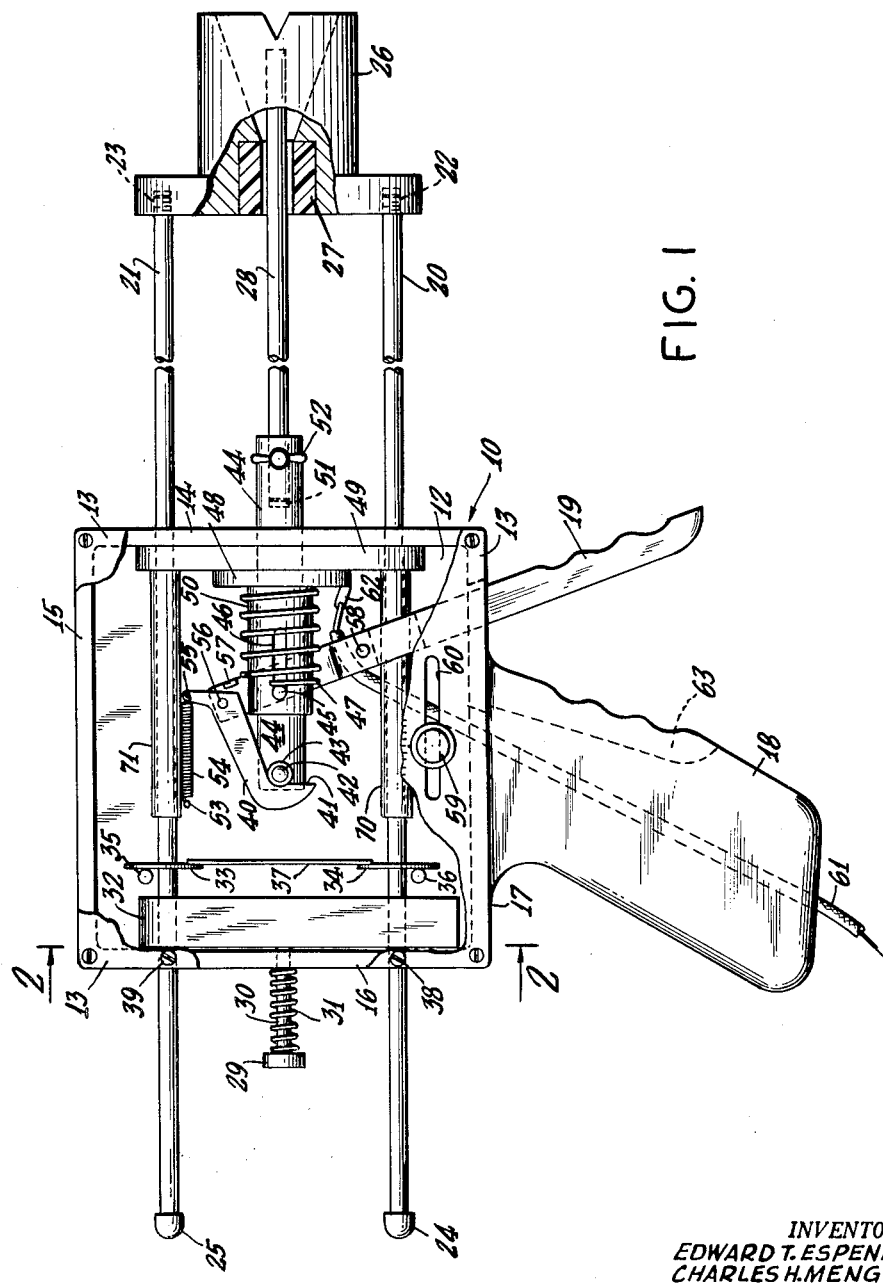
FIG. 1 is a side elevation of a welding gun embodying the invention, with parts broken away to show the interior of the gun.

The housing 10 is a rectangular box with side faces 12 and 13, end faces 14 and 16, top face 15, and bottom face 17. Handle 18 is suitably attached to bottom face 17 and contains a suitable recess 63 to contain trigger 19 when in the withdrawn position, and also contains a passageway for conductor wire 61.

Figure 3:
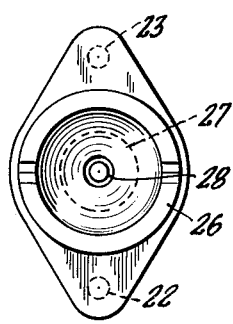
FIG. 3 is an end elevation in the plane 2—2, showing the welding shroud.

Slidable supporting rods 20 and 21 pass through housing 10 and terminate at one end in cap screws 24 and 25 and at their threaded ends 22 and 23 in welding shroud 26, shown in more detail in FIG. 3.

Figure 2:
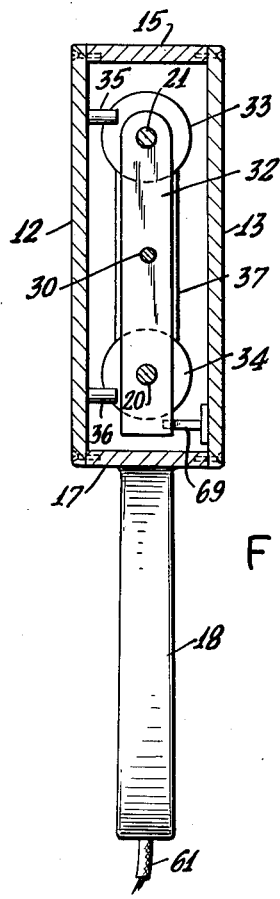
FIG. 2 is a sectional view taken along the lines 2—2 of FIG. 1, showing the sliding parts of the indexing system.
Figure 4:
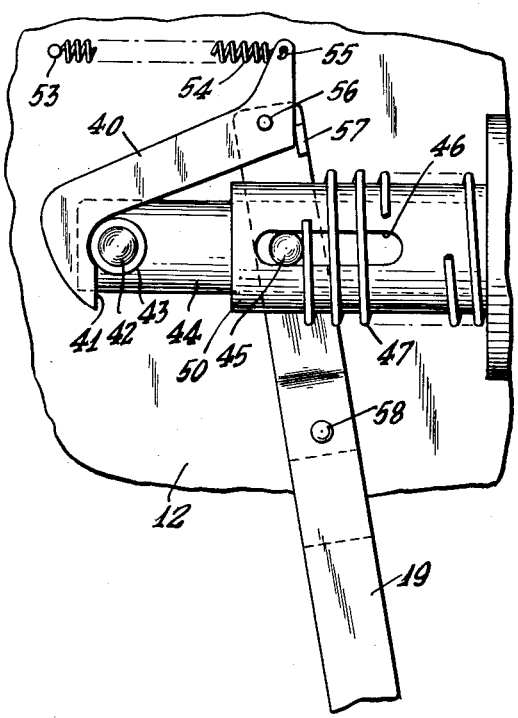
FIG. 4 is a detail view showing the operative parts of the feeding and withdrawing mechanism.

Mounted on supporting rods 20 and 21 are friction discs 33 and 34 which discs are joined by plate 37. These friction discs 33 and 34 are so designed as to slide easily along supporting rods 20 and 21 when in a plane transverse to these rods and to provide a binding stop when tilted out of this plane by the action of pins 35 and 36 mounted to side face 12. Set screws 38 and 39 are provided to adjust the slidability of supporting rods 20 and 21 so that these rods will remain stationary while friction discs 33 and 34 are pushed forward, as will be more fully described. Also mounted on supporting rods 20 and 21 is plate 32 so designed as to clear pins 35 and 36 as clearly shown in FIG. 2. Plate 32 is moved along supporting rods 20 and 21 by the action of plunger 29 which pushes plate 32 into engagement with friction discs 33 and 34 sliding them forward while supporting rods 20 and 21 are stationary. Such sliding continues until plate 32 engages stop projection 69 of the indexing mechanism shown more fully in FIG. 5. At this point, the pressure on plunger 30 is withdrawn and, through the action of spring 31 on cap 29, plate 32 is returned to its original position. Shroud 26 can then be moved closer with respect to housing 10. Supporting rods 20 and 21 accompanied by friction discs 33 and 34 will slide through housing 10 until friction discs 33 and 34 again make contact with pins 35 and 36 causing the friction discs 33 and 34 to cant and securely grip supporting rods 20 and 21 and thereupon prevent further sliding in the backward direction of said rods. The amount shroud 26 is moved closer to housing 10 is thereby controlled by indexing device 59. Sleeves 70 and 71 are slidably mounted on supporting rods 20 and 21 and are of suitable length to hold discs 33 and 34 in slidable position when rods 20 and 21 are manually extended.

Trigger 19 pivots on pin 58 and operates catch 40 which is pivotally secured to trigger 19 by pin 56. Catch face 41 engages insulated bearing 43 which is secured to rod 44 by pin 42. Welding electrode 28 is secured at the other end of rod 44 in recess 51 and removably held in place by butterfly nut 52. Attached to rod 44 is pin 45 which slides in groove 46 of tubular member 50. When trigger 19 is squeezed, rod 44 is moved in a forward direction until protrusion 57 forces catch 40 out of engagement with insulated bearing 43. Spring 47 then exerts pressure against pin 45 causing rod 44 to return to the initial position, thereby rapidly withdrawing electrode 28 from the work and breaking the circuit at the arc due to withdrawal of the electrode. When trigger 19 is released, it is returned to its initial position by the action of spring 54 attached to side face 12 by pin 53 and catch 40 at hole 55. This spring serves also to keep catch 40 in engagement with insulated bearing 43 until protrusion 57 forces it out of such engagement. It has been found that by properly contouring catch face 41, the final stage of the trigger squeeze can be made without further feeding of electrode 28 into the weld, resulting in a smooth weld button. It can be seen that catch 40 can be so constructed so as to be readily interchangeable with catches having varying faces 41 when a variety of weld cross-sections are desired.

Electric current is supplied to electrode 28 through wire 61 and terminal 62 which is in electrical contact with conductor flange 48 a part of tubular member 50. Tubular member 50 is so constructed as to be always in electrical contact with rod 44 which contains electrode 28.

Insulation is provided by the use of an insulating plate 49 as a part of face 14, by the use of an insulated bearing 43 and an insert 27 in welding shroud 26 composed of a material which has both good insulating properties and heat resistance such as porcelain or other ceramic material.

Figure 5:
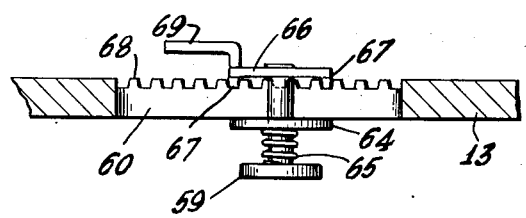
FIG. 5 is a detail plan of the indexing device.

Presetting the length of rod fed into the work per squeeze of the trigger is accomplished with slide button 59 as shown most clearly in FIG. 5. Pushing button 59 moves plate 66 and the catches 67 clear of rack 68 allowing sliding motion between disc 64 and face 13 in groove 60 to move stop projection 69 to any desired position and thereby fix the forward motion of plate 32. Upon release of button 59, spring 65 causes the re-engagement of catch 67 with rack 68 thereby preventing further sliding.

In operation the welder sets button 59 to the position desired, the support rods 20 and 21 to full extension and disc members 33 and 34 engaging pins 35 and 36. The operator then places shroud 26 against scrap suitably electrically connected and pulls the trigger 19 until rapid withdrawal occurs. This operation is a preliminary step required to adjust for a new electrode or change in setting of button 59. After an operator becomes familiar with the gun, visual adjustment of support rods 20 and 21 will accomplish this preliminary step. Upon completion of this preliminary operation the initial welding cycle is commenced in the following manner. The operator pushes cap 29 until plate 32 hits stop projection 69. Then, by applying pressure to the work in the spot where the weld is desired and without pulling the trigger, rods 20 and 21 are slid through housing 10 until discs 33 and 34 engage pins 35 and 36. Continuing pressure is maintained while the trigger 19 is squeezed. Thereupon electrode 28 is fed into the work, the arc struck, the weld completed and electrode 28 rapidly withdrawn after the predetermined amount of rod is consumed by means of the novel withdrawing device, all these operations occurring while supporting rods 20 and 21 are stationary with respect to housing 10. This allows maximum pressure to be applied to the parts to be welded during the entire operation. This pressure need not be removed until the weld has cooled as the circuit is broken on the withdrawal of electrode 28. When the electrode 28 is consumed and replaced with a new one the operator extends rods 20 and 21 by pulling on shroud 26. Discs 33 and 34 slide forward to engage sleeves 70 and 71 which are of suitable length to hold discs 33 and 34 in slidable position apart from the trigger and withdrawing mechanisms. Discs 33 and 34 must be returned to engage pins 36 and 35 before the gun is again ready to begin a new cycle as described above.

From the above disclosure it can be seen that rapid withdrawal means as described can be beneficially provided in many types of welding apparatus of which the portable manually-operated gun is only an example.

We claim:

1. An apparatus for spot welding comprising a housing, a handle for an operator attached to said housing, slidable holding means for securing an electrode and for withdrawing and extending said electrode relative to said housing, means including a trigger for extending said slidable holding means a predetermined distance upon squeezing said trigger and including means for effecting the rapid withdrawal of said slidable holding means when said trigger is fully squeezed a predetermined amount, and support rod means extending from said housing parallel with said electrode a distance greater than said electrode extends when in its withdrawn position.

2. An apparatus according to claim 1 wherein said means including a trigger for extending said slidable holding means includes a catch means attached to said trigger to engage said slidable holding means.

3. An apparatus according to claim 2 wherein said means for effecting rapid withdrawal of said slidable holding means includes means to disengage said catch means from said slidable holding means.

4. An apparatus according to claim 3 wherein said means to disengage said catch means includes a protrusion on said trigger means.

5. An apparatus according to claim 1 wherein said means for effecting rapid withdrawal of said slidable holding means includes spring means operable after said trigger is squeezed a predetermined amount, said spring means engaging and returning said slidable holding means to the withdrawn position.

6. An apparatus according to claim 1 wherein said support rod means including a shroud in which the rod means terminate at one end are slidably mounted in said housing and includes a disc mounted on said support rod so as to slide on said rod when in the transverse plane of said rod and securely grip said rod when displaced from said transverse plane, means protruding from said housing to displace said disc upon applying pressure to the support rod means in a direction toward the housing; propelling means slidably mounted on said rod to slide said disc, and adjustable indexing means disposed within said housing to stop the sliding of said propelling means at a present point.

7. An apparatus for spot welding comprising a housing, a handle for an operator attached to said housing, slidable holding means for securing an electrode and for withdrawing and extending said electrode relative to said housing, trigger means including a catch member rotatably attached thereto for engaging and extending said slidable holding means a predetermined distance upon squeezing said trigger, means to disengage said catch means from said slidable holding means when said trigger is fully squeezed including a protrusion from said trigger, spring means engaging said slidable holding means to effect rapid withdrawal of said slidable holding means upon said disengagement of said catch means from said slidable holding means, at least one support rod slidably mounted in said housing parallel with said electrode and extending from said housing a distance greater than said electrode extends when in its withdrawn position, a disc mounted on said support rod slidable when in the transverse plane of said rod and unmovable when displaced from said transverse plane, means protruding from said housing to displace said discs when an operator applies pressure, propelling means slidably mounted on said rod to slide said disc, and adjustable indexing means mounted on said housing to stop the sliding of said propelling means at a preset point.

8. An apparatus according to claim 1, wherein the support rod means is mounted in a manner such that there is no relative movement of the support rod means and the housing during the welding operation.

References Cited in the file of this patent

UNITED STATES PATENTS

| | | |
|---|---|---|
| 2,817,003 | Dusek | Dec. 17, 1957 |
| 2,898,445 | Slezak | Aug. 4, 1959 |
| 2,917,618 | Brennen et al. | Dec. 15, 1959 |
| 2,950,381 | Brennen et al. | Aug. 23, 1960 |
| 2,998,507 | Brennen et al. | Aug. 29, 1961 |

UNITED STATES PATENT OFFICE
CERTIFICATE OF CORRECTION

Patent No. 3,045,107  July 17, 1962

Edward T. Espenlaub et al.

It is hereby certified that error appears in the above numbered patent requiring correction and that the said Letters Patent should read as corrected below.

Column 4, line 30, for "present" read -- preset --.

Signed and sealed this 30th day of October 1962.

(SEAL)
Attest:

ERNEST W. SWIDER
Attesting Officer

DAVID L. LADD
Commissioner of Patents